Nov. 18, 1969   A. K. ABU-AKEEL   3,478,850
ROTATING INERTIA REDUCING MEANS FOR A BRAKE DISC
Filed June 10, 1968                                 2 Sheets-Sheet 2

INVENTOR
ABDULHADI K. ABU-AKEEL
BY
William N Antonis
ATTORNEY

United States Patent Office 3,478,850
Patented Nov. 18, 1969

3,478,850
ROTATING INERTIA REDUCING MEANS
FOR A BRAKE DISC
Abdulhadi K. Abu-Akeel, South Bend, Ind., assignor to
The Bendix Corporation, a corporation of Delaware
Filed June 10, 1968, Ser. No. 735,593
Int. Cl. F16d 65/10, 65/82; B64c 25/36
U.S. Cl. 188—218                           15 Claims

ABSTRACT OF THE DISCLOSURE

The following relates to a friction disc element construction for a disc brake which is formed of a hollow annular retainer having a floating heat sink core therein. The core is arranged within the retainer so that it has unlimited rotational freedom relative to the walls of the retainer until the walls of the retainer are forced into frictional engagement with the core.

BACKGROUND OF THE INVENTION

Conventional aircraft brakes have a set of rotating disc elements, usually referred to as rotors, which are suitably coupled to a rotating wheel of the aircraft. Braking is attained through friction when the rotors are pressed against another set of fixed disc elements, usually referred to as stators, which are coupled rigidly to a fixed axle. Either the rotors, or stators, or both, may be fitted or coated with some friction material to improve the mating friction characteristics. Braking pressure is applied by means of a set of fixed pressure cylinders and pistons, which apply a force against a pressure plate. The pressure plate, in turn, causes frictional engagement of the rotors and stators by forcing them against a fixed backing plate.

In such arrangements there are high loads occurring during wheel spin-up which are a direct result of the inertia resistance of the rotating parts of the brake. Such high loads tend to increase the duration of the wheel spin-up period, increase the wheel skid distance, increase strut loads, and shorten the life of the aircraft tires through excessive wear thereof.

SUMMARY OF THE INVENTION

Accordingly, in view of the foregoing, it is an object of this invention to provide a unique friction disc element which considerably reduces the high load effect resulting from the inertia of moving brake elements.

Another object of this invention is to reduce the duration of the wheel spin-up period and thus reduce not only the wheel-skid distance, but wheel skidding per se. Such reduced wheel skidding will result in lower strut loads and longer tire life through lower wear thereof.

A further object of this invention is to reduce the inertia of the rotor heat sink.

A still further object of this invention is to provide a friction disc element of the type described which will increase brake effectiveness and extend brake life.

An important object of this invention is to provide a friction disc element wherein the heat sink is free to rotate relative to the load-carrying components of the disc element.

More specifically, it is an object of this invention to provide a friction disc element which is formed of a hollow annular retainer having a floating heat sink core therein, said core being arranged within the retainer so that it has unlimited rotational freedom relative to the walls of the retainer until the walls of the retainer are forced into frictional engagement with the core.

Other objects, features, and advantages of the invention will be apparent from the following description of the invention taken in connection with the accompanying drawings.

DESCRIPTION OF THE PREFERRED
EMBODIMENTS

Figure 1:
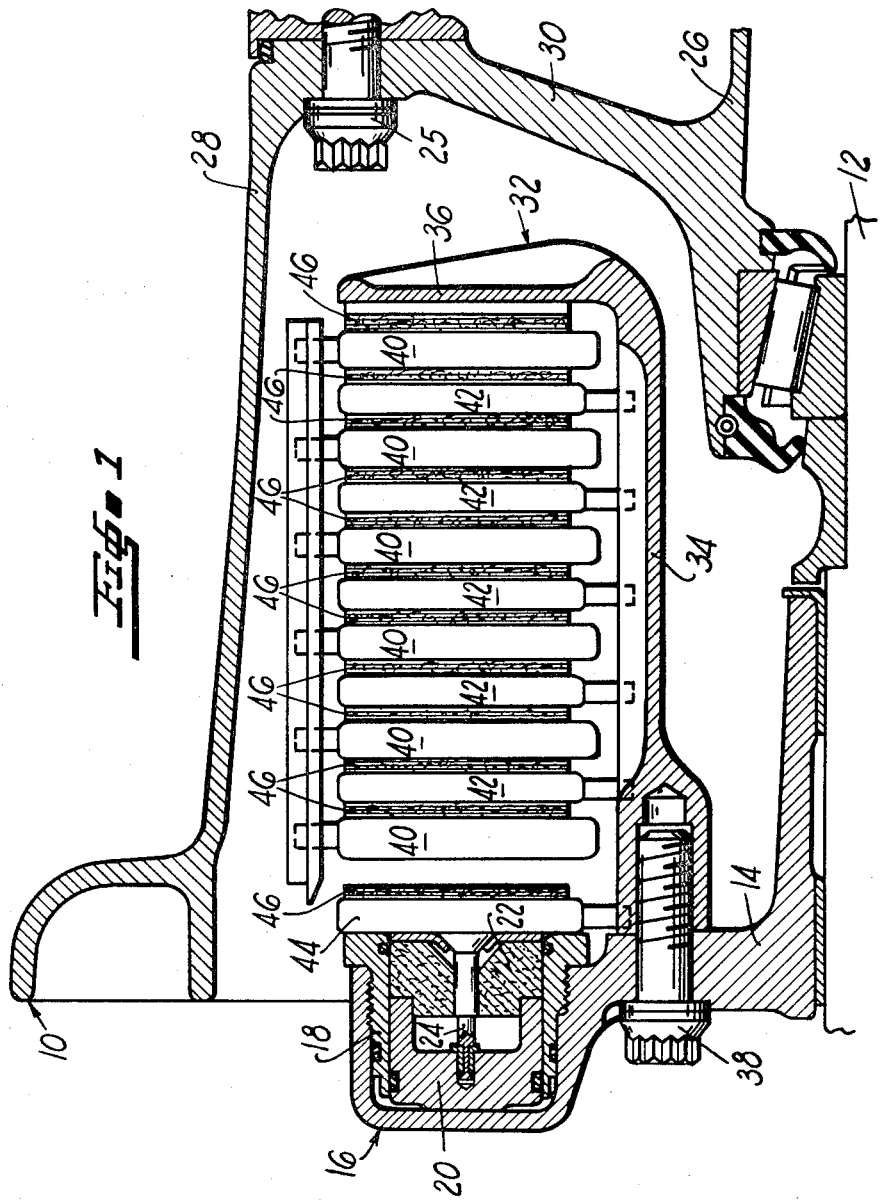
FIGURE 1 is a sectional view of a portion of a symmetrical wheel and brake assembly which incorporates the invention.

Referring to FIGURE 1, it will be seen that the wheel and brake assembly, which is illustrated, includes a wheel 10 rotatably mounted on a stationary axle 12, and a stationary carrier member 14 which is connected to the axle through any suitable means, such as by a direct bolt connection (not shown). The construction for rotatably mounting the wheel 10 to axle 12 and fixing the stationary carrier member 14 to the axle 12 is well known, and a detailed description thereof is not deemed to be necessary. The carrier contains a plurality of fluid motors 16, each of which includes a protective sleeve 18 threadedly secured to the carrier and a piston 20 located and slidable in the sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube 32, which includes a sleeve 34 and an annular backing plate flange 36, is fixedly secured to the carrier member 14 by a plurality of circumferentially spaced bolts 38.

The brake, which is illustrated, is of the disc type and includes a plurality of interleaved rotors 40, which are splined to and are rotated by the aircraft wheel 10, and includes stators 42, which are splined to sleeve 34 of the torque tube 32. The specific novel construction of the rotors will be described hereafter. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motors 16, forces the rotors 40 and stators 42 against each other upon actuation of the motors by thrusting at one side of the stack and biasing the entire stack against the backing plate 36. Pressure plate 44, each of the stators 42, and the backing plate have friction material lining 46 provided thereon.

Figure 2:
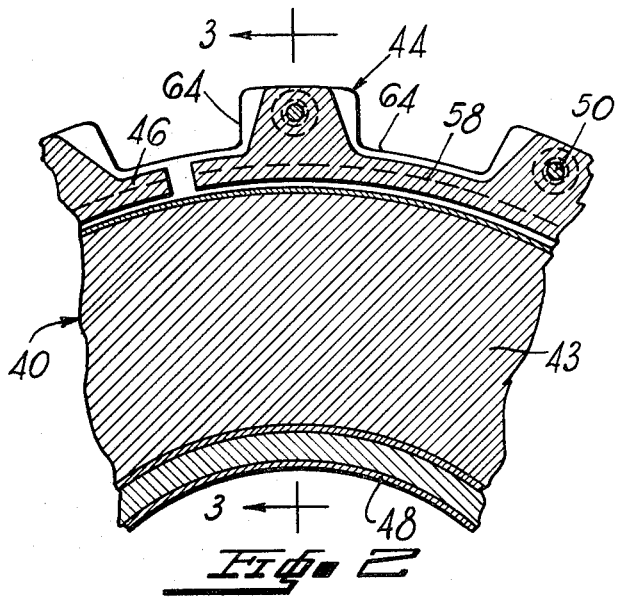
FIGURE 2 is a sectional view of a symmetrical rotor removed from the brake assembly of FIGURE 1 and taken along line 2—2 of FIGURE 3.
Figure 3:
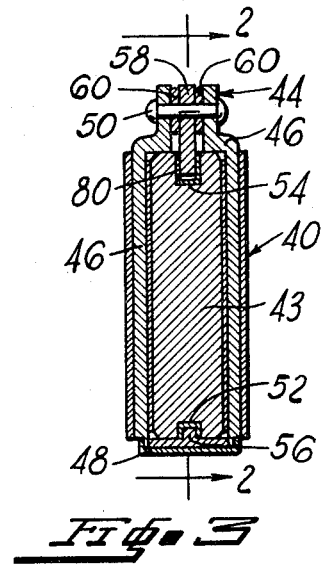
FIGURE 3 is a sectional view taken along line 3—3 of FIGURE 2.

Referring to FIGURES 2 and 3, which show the novel detailed construction of each of the rotors 40, it will be seen that each rotor is an annular composite sandwich type rotor disc element which is comprised of a floating heat sink core 43 which in effect, is encapsulated by a hollow annular retainer, indicated generally by the numeral 44. Two oppositely disposed load-carrying plates 46, which form a pair of spaced apart parallel flat retainer walls, are held together at the radially inner edge thereof by an annular retaining cap 48 and are held together at the radially outer edge thereof by a plurality of rivets 50. If desired, the retaining cap 48 can be split and formed integral with and as a flange extending from each of the load-carrying plates 46. The floating heat sink core 43 is formed with a radially inner recess 52 and a radially outer recess 54, the first of which receives an annular guide member 56 and the second of which receives an annular guide member 58. A pair of spring washers 60 located at each rivet 50 and between guide member 58 and the plates 46 urge the plates away from each other, and in conjunction with the guide members provide the necessary clearance between the heat sink core 43 and plates 46 to permit relative rotational movement between the core and the plates during wheel spin-up in the absence of applied brake pressure, that is, until the plates are forced into frictional engagement with the core. Located at the radially outer edge of the rotor are a plurality of key-slot notches 64 each of which slidably engage axially extending keys located on the inner periphery of the aircraft wheel 10. It will be understood that, if desired, the key-slot arrangement could be, or could be considered to be, reversed so that the slot is formed in the wheel and the key is formed in the radially outer edge of the rotor.

Figure 7:
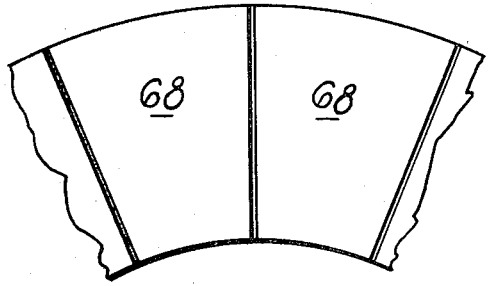
FIGURES 7 and 8 show plan and end views, respectively, of a segmented heat sink core for use in the rotor of FIGURE 2.
Figure 8:
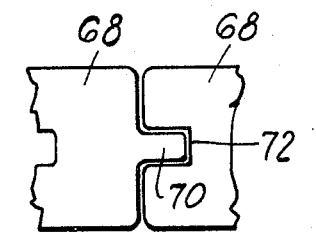

The floating heat sink core 43 can consist of a solid or a segmented ring of high heat capacity material. A suitable segmented arrangement is shown in FIGURES 7 and 8 wherein the heat sink core 43 is formed of a plurality of annularly arranged segments 68 which are interconnected by a tongue 70 and groove 72 arrangement for preventing premature binding of the segmented core within the retainer. Beryllium has been found to be quite suitable for a heat sink core of the type which is contemplated. Other material having the characteristics of beryllium, particularly a high enthalpy, that is, a high heat content per unit mass, would also be suitable as a heat sink core. The retainer plate 46 should be formed of a material having a good wear surface, such as for example, Timken 1722A–S steel. If desired, the wear characteristics of the plates may be improved by attaching or suitably depositing lining material on the plate faces.

From the foregoing it will be apparent that upon touchdown of the aircraft the wheel will spin-up, but, initially, only the rotor retainer 44, which is directly coupled to the wheel, will rotate at the same speed as the wheel. The floating heat sink core 43, which is free to rotate relative to the retainer, will lag the wheel, that is, will rotate at a lesser speed than the retainer. Since the core will be effected by the rotating or spinning wheel only through frictional contact with the plates 46 of the retainer, the core resistance to wheel spin-up is reduced. The frictional forces between the retainer walls and the core, which arise during the application of braking pressure, will then accelerate the core (at a much lower rate than the wheel acceleration) until both attain the same speed and rotate as a unit. Thus, by permitting the core to move rotationally relative to the retainer there is less inertia to overcome during spin-up of the wheel during landing and the wheel can come up to the speed of the aircraft more quickly and in a shorter distance.

Figure 4:
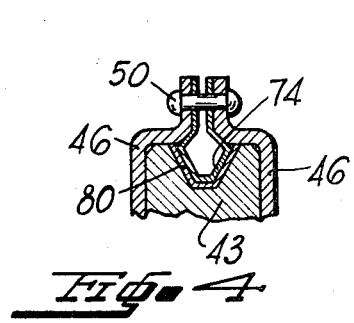
FIGURES 4, 5 and 6 are fragmentary sectional views, similar to FIGURE 3, which show various other embodiments of the invention.
Figure 5:
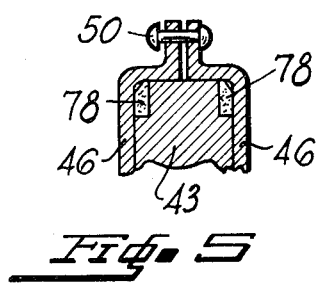
Figure 6:
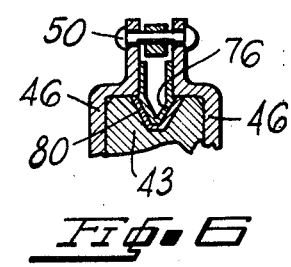

Other structural arrangements for providing clearance between the heat sink core and the load-carrying plates of the retainer are shown in FIGURES 4, 5, and 6. Thus, if desired, a single annular spring guide and separator 74 or 76, as shown in FIGURES 4 and 6, respectively, could be substituted for the guide member 58 and the pair of spring washers 60 shown in FIGURE 3. If no means are provided for locating the core relative to the retainer plates wear shoulders 78, as shown in FIGURE 5, can be provided to reduce wear on the core corners during retainer spin-up at aircraft landing touchdown. As shown in FIGURES 3, 4, and 6, low wear elements 80 can be located between the guide members and the core to prevent excessive wear of the core. In addition in all of the embodiments, it will be understood that the length of the rivets will be such that the load-carrying plates can move axially relative to the heat sink core.

Some of the many advantages of a rotor disc element constructed in the foregoing novel manner are as follows:

(a) Reduction of the high load effect resulting from the inertia of moving brake elements;

(b) Reduction in the duration of the wheel spin-up period and hence reduction of the wheel-skid distance;

(c) Reduction of the inertia of the rotor heat-sink;

(d) Lower resulting strut loads because of reduced skidding;

(e) Lower tire wear and longer tire life because of reduced skidding; and (f) Improved distribution of heat-sink material which permits increased power dissipation within the brakes.

In addition to the above advantages, other advantages may suggest themselves to those who are familiar with the art to which this invention relates.

Furthermore, although this invention has been described in connection with certain specific embodiments, it will be obvious to those skilled in the art that various changes may be made in the form, structure, and arrangement of components without departing from the spirit of the invention. For example, the plates can be provided with holes or radial slits to minimize warpage. In addition suitable material of high heat conductivity could be inserted between the load-carrying plates and the core to improve heat conductivity to the core. Accordingly, I do not desire to be limited to the specific embodiments disclosed herein.

Having thus described the various features of the invention, what I claim as new and desire to secure by Letters Patent is:

1. In a wheel and brake assembly having axially extending key-slot type engaging means, a rotatable friction disc element comprising a hollow annular retainer having spaced-apart parallel flat walls and radially inner and outer edges, said walls being arranged to move axially towards each other, a floating heat sink core located within said retainer, said core being continuously in a solid state and having unlimited rotational freedom relative to said walls until frictionally engaged thereby, mating key-slot type engaging means operatively connected to said disc element for slidable engagement with said first-mentioned key-slot type engaging means, and means for providing clearance between said core and said walls to permit relative rotational movement between said core and said walls until said walls are forced into frictional engagement with said core.

2. The structure, as defined in claim 1, wherein said hollow annular retainer includes two oppositely disposed load-carrying plates for forming said walls.

3. The structure, as defined in claim 1, wherein said means for providing clearance includes resilient means for urging said plates away from each other.

4. The structure, as defined in claim 1, wherein said means for providing clearance includes guide means for locating said core relative to said plates.

5. The structure, as defined in claim 1, wherein said means for providing clearance includes resilient guide means for urging said plates away from each other and for locating said core relative to said plates.

6. The structure, as defined in claim 1, wherein said means for providing clearance includes wear shoulders at the corners of said core to reduce corner wear on the core.

7. The structure, as defined in claim 1, wherein said core is formed of a single annular segment.

8. The structure, as defined in claim 1, wherein said core is formed of a plurality of annularly arranged segments.

9. The structure, as defined in claim 8, wherein said annularly arranged segments are interconnected to prevent premature binding within said retainer.

10. The structure, as defined in claim 1, wherein said mating key-slot type engaging means is located on one of the edges of said annular retainer.

11. The structure, as defined in claim 10, wherein said mating key-slot type engaging means is located on the radially outer edge of said annular retainer.

12. In a wheel and brake assembly having axially extending key-slot type engaging means, a rotatable friction disc element comprising a hollow annular retainer which includes two oppositely disposed load carrying plates having spaced-apart parallel flat walls and radially inner and outer edges, said plates being arranged to move axially towards each other, a floating heat sink core located within said retainer, said core being continuously in a solid state and having radially inner and outer annular surfaces, means for providing clearance between said core and said plates to permit relative rotational movement between said core and said plates until said plates are forced into frictional engagement with said core, said means for providing clearance including guide means for locating said core relative to said plates, recess means located in at least one of said annular surfaces for receiving said guide means, and mating key-slot type engaging means operatively connected to said disc element for slidable engagement with said first-mentioned key-slot type engaging means.

13. The structure, as defined in claim 12, wherein said recess means include low wear elements interposed between said guide means and said core to prevent excessive wear of said core.

14. The structure, as defined in claim 12, wherein said guide means includes a resilient member adapted to urge said plates away from each other and to locate said core relative to said plates.

15. The structure, as defined in claim 14, wherein said resilient member is a substantially U-shaped spring member the base of which is located in said recess means and the arms of which engage said plates.

References Cited
UNITED STATES PATENTS

| | | | |
|---|---|---|---|
| 2,824,467 | 2/1958 | O'Connor | 74—574 |
| 2,943,714 | 7/1960 | Aldrich et al. | 188—264 |
| 3,208,559 | 9/1965 | Chambers et al. | 188—264 |
| 3,376,960 | 4/1968 | Bender | 188—264 X |

GEORGE E. A. HALVOSA, Primary Examiner

U.S. Cl. X.R.

74—574; 188—264; 244—103, 111